United States Patent [19]
Roldan et al.

[11] 3,764,594
[45] Oct. 9, 1973

[54] METHOD OF OBTAINING CYTOSINE INOSINATE AND DERIVATIVES

[75] Inventors: Cristobal Martinez Roldan; Miguel Fernandez Brana; Antonio Vila-Coro Barrachina, all of Madrid, Spain

[73] Assignee: Laboratorios Made, S.A., Madrid, Spain

[22] Filed: Nov. 9, 1970

[21] Appl. No.: 88,114

[30] Foreign Application Priority Data
Nov. 7, 1969   Spain .................................... 373319

[52] U.S. Cl. .......................... 260/211.5 R, 424/180
[51] Int. Cl. ............................................. C07d 51/50
[58] Field of Search ............................. 260/211.5 R

[56] References Cited
UNITED STATES PATENTS

| | | | |
|---|---|---|---|
| 3,652,538 | 3/1972 | Niblack | 260/211.5 R |
| 3,049,536 | 8/1962 | Reiff et al. | 260/211.5 R |
| 3,340,249 | 9/1967 | Anraku et al. | 260/211.5 R |
| 3,413,282 | 11/1968 | Yoshikawa et al. | 260/211.5 R |
| 3,440,190 | 4/1969 | Melby | 260/211.5 R |
| 3,507,854 | 4/1970 | Sunagawa et al. | 260/211.5 R |
| 3,523,684 | 10/1970 | Suzuki et al. | 260/211.5 R |

Primary Examiner—Lewis Gotts
Assistant Examiner—Johnnie R. Brown
Attorney—Woodhams, Blanchard & Flynn

[57] ABSTRACT

A compound of the formula

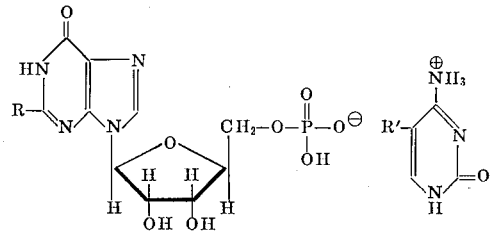

wherein R is selected from the group consisting of H and $NH_2$, and R' is selected from the group consisting of H, $CH_3$ and $CH_2OH$.

The compound is prepared by reacting cytosine and inosinic acid in a polar solvent and is useful in the treatment of hepatic diseases.

1 Claim, No Drawings

METHOD OF OBTAINING CYTOSINE INOSINATE AND DERIVATIVES

It is already known that the purine or pyrimidine bases of nucleotids, or their precursors, are of extreme interest in the treatment of many diseases, particularly hepatic diseases.

The object of the present invention is the industrial production of a compound formed by conjugating the two types of bases mentioned, and which in accordance with its structure is called cytosine inosinate.

This compound has the following formula:

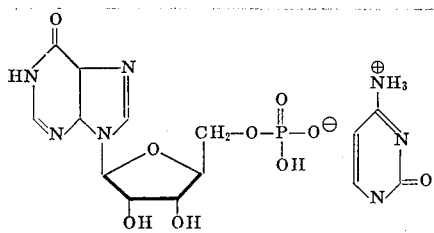

Another object of the invention is the production of cytosine inosinate derivatives of the general formula:

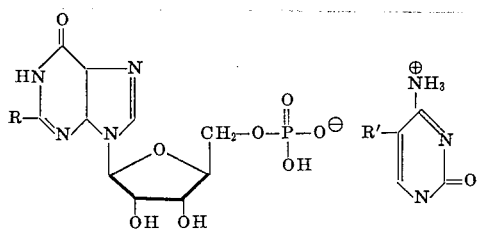

wherein R signifies $NH_2$, and R' signifies $CH_3$ or $CH_2OH$.

The general method of synthesis of this compound consists of the separate dissolution of the inosinic acid and the cytosine in the least possible quantity of a heated polar solvent, and the subsequent mixture of the two solutions, or the dissolution of the two solid components in the same solvent at boiling temperature.

EXAMPLE

As an example, the following is a description of the reaction in obtaining the cytosine inosinate, using water as the solvent.

In a whirling reactor, one litre of water and 348.2 gms. (1 mol) of inosinic acid were heated to boiling. When the water was boiling, addition was made of 111.1 gms. (1 mol) of cytosine. When this addition was completed and all the cytosine had dissolved, the reaction mixture was filtered under heat and allowed to cool. A white, feather-crystallised solid immediately appeared.

Once the solution was cool, the solid was removed and then washed three times with a litre of a solution of 50 percent alcohol in water and finally with two litres of 96° alcohol.

Once dry, the product weighed 370 gms. (yield = 80 percent) and had an uncorrected melting point of 220°C. (with decomposition).

Analysis:
Calculated for $C_{14}H_{18}N_7O_9P$
C:36.60; H:3.92; N:21.35; P:6.74

Found
C:36.32; H:3.72; N:21.10; P:6.92

Infra-red Spectrum (Brk): The most characteristic bands appear at 2,500–3,500 $cm^{-1}$ (OH and NH of the molecule); 1590 and 1680 $cm^{-1}$ (heterocyclic C=C and C=N); 1720 (amidic C=O); 1,245 $cm^{-1}$ (P=O group); 1,035 $cm^{-1}$ (P—O—C of the phosphoric group) — 960 $cm^{-1}$ (pyrimidinic ring).

Nuclear Magnetic Resonance Spectrum ($D_2O$): Bands appear at = 1.60 and 1.80 (the two hydrogens of the hypoxanthine ring); 2.25 – 2.38 (duplet corresponding to the meta-hydrogen of the cytosine ring); 3.90 (hydrogen in orthorespect to the cytosine amino group); 4.02 (carbon ribose hydrogen bonded to nitrogen); 5.30 – 5.80 (multiplet of hydrogens bonded to alcoholic sugar carbons); 5.8 – 6.0 (sugar methylene hydrogens) p.p.m.

The Ultra-violet Spectrum has a maximum of 250 m$\mu$ (log$\epsilon$=4.146).

The product is a white solid formed by crystals which are feathered at the beginning of crystallization and which finally blend together to form a compact cake. It is somewhat soluble in water and only slightly or not at all soluble in organic solvents. The empirical formula is $C_{14}H_{18}N_7O_9P$, which has a molecular weight of 459.314. The aqueous solution has a pH of 3.2 in a 3 percent concentration.

PHARMACOLOGICAL STUDY

Acute Toxicity

The product of the invention is non-toxic and the dose administered to mice, limited by the volume that can be injected to them, did not produce toxic symptoms.

With doses of 30 mg/mouse administered to 20 mice of 20 grams weight each, no deaths have occurred.

Chronic Toxicity

Mice of 9 ± 1.5 grams were used. The dose administered was 1 milligram/mouse/day. The animals were kept under observation and every alternate day their weight was checked. The treated mice looked in general better than the untreated ones (smoother fur, etc). Microscopically, no toxic alteration was observed after a 6 months treatment period. The microscopic study did not show any tissue or organ alteration. Compared with the controls (not treated with the product of the invention), the treated mice showed a slight increase in weight but the same was not statistically significant.

The dose administered to rabbits was 10 milligrams/kilogram of body weight and no haematological change was observed after 90 days treatment (blood cell count, differential, hemoglobin, E.S.R., and mean corpuscular value).

Pharmacological Activity As Liver Protector

Male and female white mice were used. They were injected with toxic doses of 5 milligrams of carbon tetrachloride/mouse for 90 continuous days, after which they were killed. Microscopic studies of their livers were performed to determine the characteristics of the hepatic cells, Kupffer cells, interlobular spaces, existance and localization of steatosis and inflammation signs.

The mice injected with 10 milligrams/mouse/day of the product of the invention showed fewer changes than the controls (untreated).

It was also observed that the regeneration signs were more marked in the treated animals than in the controls, with an increased number of mitosis and amitosis cells. Therefore, the product of the invention produces a better protection of the liver and increases markedly the regeneration.

These results have ben confirmed by histological and enzyme tests (GOT and GPT) in rats injected with 500 milligrams/kilogram of body weight/day.

Clinical Experiences With Cytosine Inosinate

Cytosine inosinate is a salt of inosine in which the cytosine acts as a base and is a precursor of purine and pyrimidine bases. It associates with the nucleic acids and changes the abnormal metabolism of the proteins, fats and hydrocarbonates. It has also been proved experimentally, that it prevents liver cell necrosis and stimulates their regeneration. With the administration of cytosine inosinate, the accumulation of fats produced experimentally at "hepatoma" level, has been reduced. The drug acts as an excellent lipotropic, prophylactic and curative substance of the fatty degeneration of the liver.

The cytosine inosinate activates and catalyzes the enzyme systems of the mitochondria in the liver cells and takes an active part in liver parenchyma functions, protecting it from harmful factors which could alter its structure. Besides, the cytosine inosinate has a regenerative effect on the altered cells and reduces the degenerative effects produced by the action of harmful factors.

From the results of clinical studies the actions of the cytosine inosinate on the liver function can be summarized as follows:

1. Strong regenerator of the liver function.
2. Regulator of the liver metabolism.
3. Normalizer of the altered functions.

In the treatment of acute, chronic and "serum" hepatitis, as well as in cirrhosis of the liver, etc., the cytosine inosinate improves the liver function tests and the subjective symptoms existing in the mentioned diseases.

The product of the invention can be administered in the form of tablets containing 10 to 250 mg. of active ingredient or in the form of aqueous solutions for oral or parenteral administration. The pharmaceutical dosage forms can include pharmaceutical acceptable inert ingredients such as excipients, binders, carriers, flavorings, etc.

The embodiments of the invention in which an exclusive property or privilege is claimed are defined as follows:

1. A compound of the formula

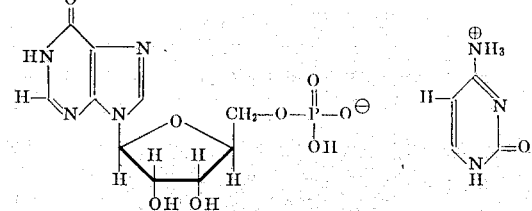

wherein R is selected from the group consisting of H and $NH_2$, and R' is selected from the group consisting of H, $CH_3$ and $CH_2OH$.

* * * * *